United States Patent
Tsirkin et al.

(10) Patent No.: US 9,235,538 B2
(45) Date of Patent: Jan. 12, 2016

(54) INJECTING INTERRUPTS IN VIRTUALIZED COMPUTER SYSTEMS

(71) Applicant: Red Hat Israel, Ltd., Raanana (IL)

(72) Inventors: Michael Tsirkin, Yokneam Yllit (IL); Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 318 days.

(21) Appl. No.: 13/761,874

(22) Filed: Feb. 7, 2013

(65) Prior Publication Data

US 2014/0223060 A1   Aug. 7, 2014

(51) Int. Cl.
*G06F 13/24* (2006.01)
*G06F 13/32* (2006.01)

(52) U.S. Cl.
CPC ............. *G06F 13/24* (2013.01); *G06F 13/32* (2013.01); *G06F 2213/2414* (2013.01); *G06F 2213/2418* (2013.01)

(58) Field of Classification Search
CPC ............ G06F 13/24; G06F 2213/2414; G06F 2213/2418; G06F 2213/2424
USPC ................................................. 710/260–269
See application file for complete search history.

(56) References Cited

U.S. PATENT DOCUMENTS

| | | | |
|---|---|---|---|
| 7,000,051 B2 * | 2/2006 | Armstrong et al. | 710/267 |
| 7,707,341 B1 * | 4/2010 | Klaiber et al. | 710/244 |
| 8,055,827 B2 * | 11/2011 | Serebrin et al. | 710/260 |
| 8,180,944 B2 * | 5/2012 | Serebrin et al. | 710/269 |
| 8,234,429 B2 * | 7/2012 | Serebrin | 710/260 |
| 8,234,432 B2 * | 7/2012 | Serebrin | 710/268 |
| 8,489,789 B2 * | 7/2013 | Serebrin et al. | 710/267 |
| 8,566,492 B2 * | 10/2013 | Madukkarumukumana et al. | 710/260 |
| 8,706,941 B2 * | 4/2014 | Serebrin et al. | 710/267 |
| 2004/0205272 A1 * | 10/2004 | Armstrong et al. | 710/260 |
| 2010/0191885 A1 * | 7/2010 | Serebrin et al. | 710/260 |
| 2010/0191887 A1 * | 7/2010 | Serebrin | 710/267 |
| 2010/0191888 A1 * | 7/2010 | Serebrin et al. | 710/269 |
| 2010/0191889 A1 * | 7/2010 | Serebrin | 710/269 |
| 2011/0161541 A1 * | 6/2011 | Madukkarumukumana et al. | 710/260 |
| 2013/0232288 A1 * | 9/2013 | Madukkarumukumana et al. | 710/269 |

OTHER PUBLICATIONS

Nakajima, Jun; "Enabling Optimized Interrupt/APIC Virtualization in KVM"; Intel Corporation; KVM Forum 2012; Nov. 8, 2012; all pages.*
Tu, Cheng-Chun; "Interrupts Delivery in a Multi-host Environment"; Sep. 25, 2012; all pages.*
Unknown. "Intel 64 and IA-32 Architectures Software Developer's Manual", vol. 3A (Jan. 2013), pp. 169-221.
Message to vger.kernel.org email list at http://vger.kernel.org/.

* cited by examiner

*Primary Examiner* — Glenn A Auve
(74) *Attorney, Agent, or Firm* — Lowenstein Sandler LLP

(57) ABSTRACT

Systems and methods for injecting interrupts in a virtualized computer system. An example method may comprise providing a data structure associating message destination addresses and virtual processor identifiers for a plurality of interrupt destination modes, receiving an interrupt message including a message destination address, looking up the message destination address in the data structure, and forwarding the interrupt message to a virtual processor associated by the data structure with the message destination address.

20 Claims, 5 Drawing Sheets

INJECTING INTERRUPTS IN VIRTUALIZED COMPUTER SYSTEMS

TECHNICAL FIELD

The present disclosure is generally related to virtualized computer systems, and is more specifically related to systems and methods for efficient interrupt routing in virtualized computer systems.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor.

One design aspect in a virtualized computer system is routing and processing of interrupts. "Interrupt" herein shall refer to an event that requires a processor to execute event-specific instructions, which might involve the processor's holding the current thread of execution and/or switching contexts.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for efficient interrupt routing in virtualized computer systems. Efficient interrupt routing may be important in improving interrupt processing latency.

In a multi-processor computer system, interrupts may be processed by one or more interrupt controllers such as Advanced Programmable Interrupt Controllers (APICs), including one local APIC per processor and one or more input/output (I/O) APICs connected to I/O devices. An interrupt may be addressed to any subset of processors within the system. The destination of an interrupt may be specified in the physical or logical destination mode. In the physical destination mode, the destination processors are identified by an APIC identifier which is compared to the identifier value stored by the APIC in a dedicated register. The logical destination mode may be used to increase the number of addressable APICs. In the logical destination mode, the destination processors are identified by a message destination address (MDA) which is compared to the APIC logical destination register (LDR), as described in details herein below.

In a computer system running one or more virtual machines, interrupts may be virtualized by the hypervisor identifying one or more virtual processors for servicing an outstanding interrupt, and "injecting the interrupt" by routing it to the identified virtual processors. Injectable interrupts may include external interrupts, non-maskable interrupt (NMI), processor exceptions, software-generated interrupts, and/or software traps.

In a virtualized computer system, the hypervisor may keep a list of currently active virtual processors, and for every virtual processor may keep its current context including the contents of the APIC registers. Hence, when routing an interrupt, the hypervisor may identify the target APIC by comparing the MDA to the values stored in APIC registers for APICS of the currently active virtual processors. Cycling through the data structures storing the contents of APIC registers for the currently active virtual processors in the system may increase the interrupt processing latency beyond acceptable levels.

A more efficient interrupt routing in a virtualized computer system may be provided by the hypervisor-supported data structure mapping an MDA to a virtual processor for one or more interrupt destination modes. Various aspects of the above referenced methods and systems are described in details herein below by way of examples, rather than by way of limitation.

Figure 1:
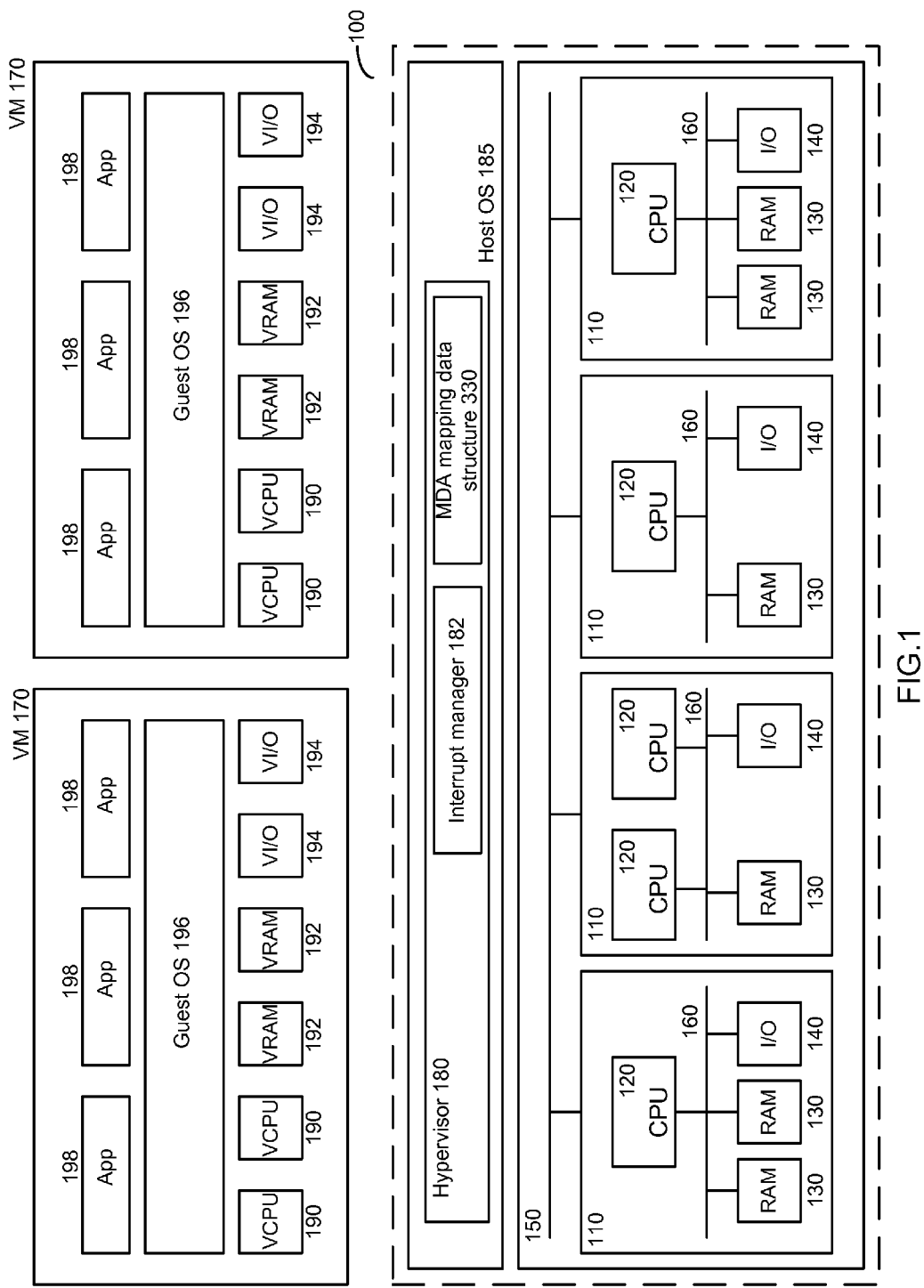
FIG. 1 depicts a high-level component diagram of an example multi-processor computer system, in accordance with one or more aspects of the present disclosure.

FIG. 1 depicts a high-level component diagram of an example multi-processor computer system 100 in accordance with one or more aspects of the present disclosure. The computer system 100 may include one or more interconnected nodes 110. Each node 110 may in turn include one or more physical processors 120 communicatively coupled to memory devices 130 and input/output (I/O) devices 140.

"Physical processor" or "processor" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120 may be interconnected using a variety of techniques, ranging from a point-to-point processor interconnect, to a system area network 150, as shown in FIG. 1, such as an InfiniBand-based network. Local connections within each node 110, including the connections between a processor 120 and a memory 130 and between a processor 120 and an I/O device 140 may be provided by one or more local buses 160 of suitable architecture, for example, PCI.

As noted herein above, computer system 100 may run multiple virtual machines 170, by executing a software layer 180, often referred to as "hypervisor," above the hardware and below the virtual machines, as schematically shown in FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, and virtual I/O devices 194.

A virtual machine 170 may execute a guest operating system 196 which may utilize the underlying virtual processors 190, virtual memory 192, and virtual I/O devices 194. One or more applications 198 may be running on a virtual machine 170 under the guest operating system 196.

A virtual machine 170 may include multiple virtual processors 190. Processor virtualization may be implemented by the hypervisor 180 scheduling time slots on one or more physical processors 120 such that from the guest operating system's perspective those time slots are scheduled on a virtual processor 190.

For virtualization of interrupts, the hypervisor 180 may in one implementation include an interrupt manager 182 which may identify one or more virtual processors 190 for servicing an outstanding interrupt using a data structure 330 mapping a message destination address (MDA) to a virtual processor for one or more interrupt destination modes, and "injecting the interrupt" by routing it to the identified virtual processors, as described in details herein below.

In a multi-processor computer system, interrupts may be processed by one or more Advanced Programmable Interrupt Controllers (APIC), including one local APIC per processor and one or more I/O APICs. An APIC may be integrated within a processor or may be provided by a separate component.

An APIC may be identified by an identifier stored in one of the APIC registers. Upon reset or power up event, the system hardware may assign a unique APIC identifier to each local APIC contacted to the system bus or the APIC bus. The processor may receive the hardware assigned APIC identifier by sampling pre-defined processor pins and may further store the value in the local APIC ID register. In a multi-processor system, the local APIC identifier may also be used as a processor identifier by the BIOS and operating system.

The local APIC may receive interrupts from local sources (including APIC timer interrupts, APIC internal error interrupts, performance monitoring counter interrupts, thermal sensor interrupts, and I/O devices connected to the processor's local interrupt pins either directly or via an external interrupt controller) and externally connected I/O devices (i.e., I/O devices connected to an I/O APIC), as well as inter-processor interrupts (IPIs). The latter may be used for software self-interrupts, interrupt forwarding or preemptive scheduling. The local APIC may handle interrupt from externally connected I/O devices by the IPI message handling mechanism.

A processor may generate an IPI by programming the interrupt command register (ICR) of the local APIC. Writing to the ICR causes an IPI message to be generated and issued on the system bus or APIC bus. An IPI may be send to other processors on the system or to the originating processor (self-interrupt).

Figure 2:
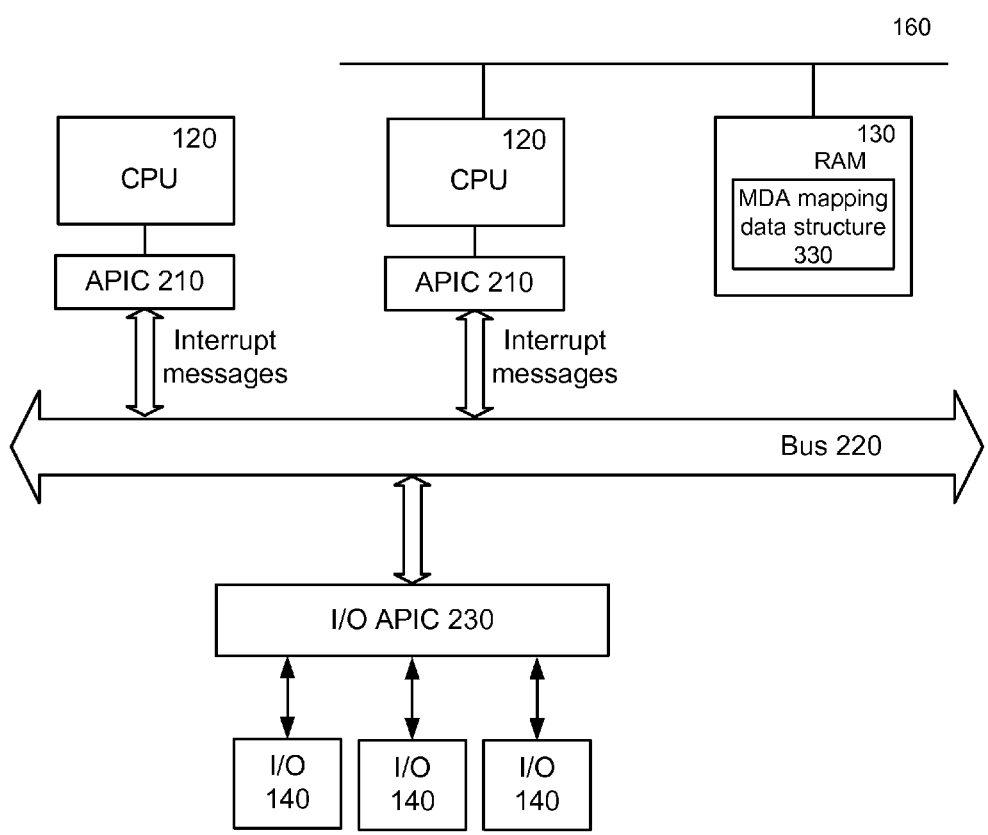
FIG. 2 schematically illustrates interrupt handling components of a multi-processor computer system, in accordance with one or more aspects of the present disclosure.

FIG. 2 schematically illustrates interrupt handling components of a multi-processor computer system. Each processor 120 may be communicatively coupled to a local APIC 210 which may be integrated within a processor or may be provided by a separate component. Local APICs 210 may be connected to a bus 220 which may be provided by a system bus or APIC bus, depending upon the processor model. Also connected to the bus 220 may be one or more I/O APICs 230. One or more external devices 140 may be connected to each of the I/O APICS 230.

An interrupt may be addressed to any subset of processors. The destination of an interrupt may be specified in the physical or logical destination mode. In the physical destination mode, the destination processor may be specified by the identifier of the corresponding local APIC. A single processor, several processors, or all processors on the bus (broadcast mode) may be addressed in the physical destination mode.

The number of addressable processors may be increased by employing the logical destination mode. In the logical destination mode, the destination processor is identified by a message destination address (MDA) which is compared by the receiving APIC to the values stored in its logical destination register (LDR) and destination format register (DFR). The MDA is interpreted depending upon the destination model programmed by the contents of the DFR. In the flat model, a unique local APIC identifier may be established for up to eight local APICs by setting a different bit in the logical APIC ID field of the LDR for each local APIC. A group of local APICs may then be selected by setting the corresponding bits in the MDA. A broadcast message to several APICs may be sent by setting all bits in the MDA. In the cluster model, two basic destination schemes may be supported: flat cluster and hierarchical cluster. In the flat cluster scheme, which assumes several APICs being connected through the APIC bus, the MDA contains several bits at pre-defined positions encoding an address of the destination cluster, and several bits at pre-defined positions identifying one or more APICs within the cluster. In the hierarchical cluster scheme, a hierarchical network may be created by connecting different flat clusters via independent buses.

The delivery mode may be by-passed in favor of broadcasting the IPI to several processors on the system bus and/or back to the originating processor by setting the corresponding bits in the destination shorthand field of the ICR.

Extensions for both physical and logical destination modes are provided by Intel extended APIC (x2APIC) architecture. In the x2APIC mode, flat logical mode is not supported, and hence the DFR is eliminated. The logical x2APIC ID field of the LDR is partitioned into two sub-fields: a cluster ID specifying the address of the destination cluster and a logical ID of the individual local x2APIC within the specified cluster.

In addition to the above described several types of interrupts, some PCI devices may use an interrupt method referred to as message-signaled interrupt (MSI) when they need to interrupt the processor. A PCI device may request service by writing a message to a specified address. The MSI protocol supports logical and physical destination modes.

Upon receiving an interrupt from a local source, an interrupt message from an I/O APIC, or and IPI, the local APIC may determine whether it is the specified destination for the interrupt message. If it is the specified destination, it may accept and process the message; otherwise, the message may be discarded.

In a computer system running one or more virtual machines, interrupt servicing methods are based on processor virtualization. The latter may be achieved by the hypervisor allocating one or more virtual processors for each virtual machine, by scheduling time slots on one or more physical processors. Depending upon hypervisor configuration settings, the number of virtual processors defined in the system may differ from the number of physical processors. Depending upon hypervisor configuration settings, a virtual processor may or may not have affinity to a physical processor, also referred to as "processor pinning" in some implementations.

For virtualization of interrupts, the hypervisor 180 may in one implementation include an interrupt manager 182 which may identify one or more virtual processors 190 for servicing an outstanding interrupt using a data structure 330 mapping a message destination address (MDA) to a virtual processor for one or more interrupt destination modes, and "injecting the interrupt" by routing it to the identified virtual processors, as described in more details herein below with references to FIG. 3.

Figure 3:
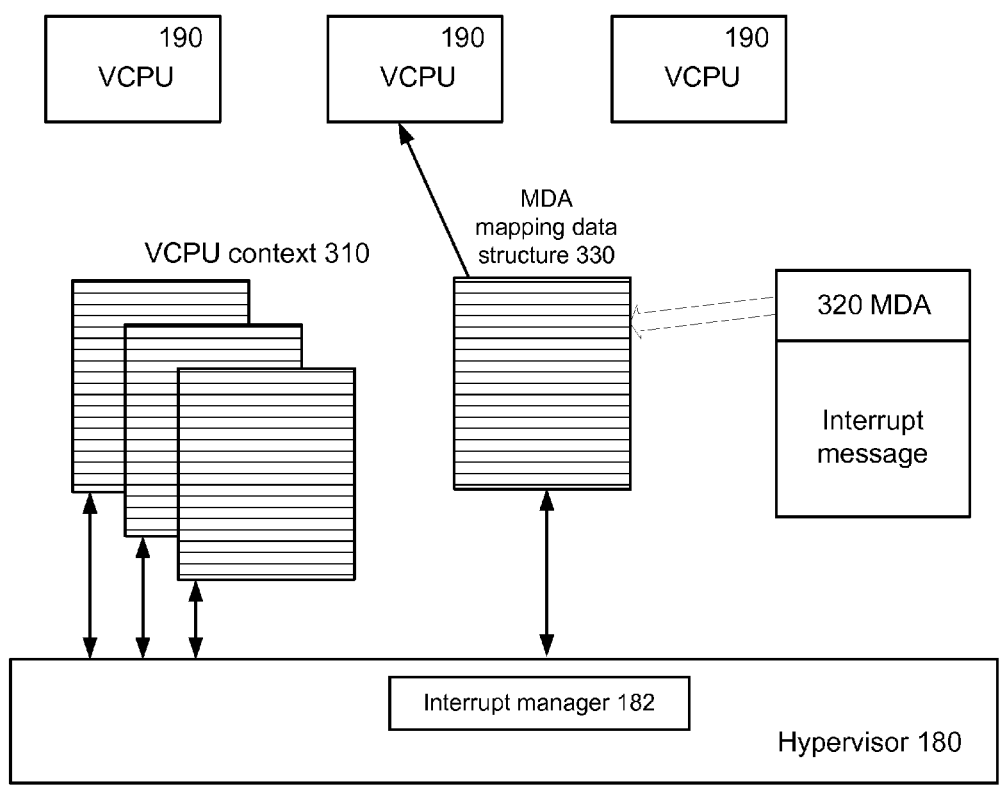
FIG. 3 schematically illustrates various data structures employed by a hypervisor, in accordance with one or more aspects of the present disclosure.

FIG. 3 schematically illustrates various data structures employed by a hypervisor, in accordance with one or more aspects of the present disclosure. Referring to FIG. 3, the hypervisor may maintain in its memory one or more data structures 310 employed to store contexts of a plurality of virtual processors 190 defined in the system, as schematically shown in FIG. 3. A virtual processor context may include the value of processor registers (including local and I/O APIC registers), the program counter, and the processor cache. The hypervisor may route an outstanding interrupt to one or more virtual processors for servicing by accordingly modifying the contexts 310 of the virtual processors selected to process the outstanding interrupt and scheduling time slots on one or more physical processors 120 for each of the selected virtual processors 190. The context modification may be performed by modifying the values stored within the data structures 310 corresponding to the processor registers and the program counter. Scheduling, on behalf of a virtual processor, a thread to be executed on a physical processor 120 may be performed by switching the physical processor's context to the context stored in a data structure 310 corresponding to the virtual processor.

When dispatching an interrupt to one or more virtual processors, the hypervisor may identify the target APICs by comparing the MDA to the values stored in APIC registers for APICS of the virtual processors defined in the system. However, cycling through the data structures 310 storing the contents of APIC registers for several virtual processors may increase the interrupt processing latency beyond an acceptable level. A more efficient interrupt routing in a virtualized computer system may be provided by the hypervisor supporting a data structure employed to map MDA values to virtual processors, for each of the physical and logical interrupt destination modes.

Hence, as schematically illustrated by FIG. 3, the hypervisor may look up the MDA 320 of an outstanding interrupt message in the MDA mapping data structure 330 in order to identify one or more virtual processors 190 to send the interrupt message to, thus eliminating the need to cycle through the data structures storing the contents of APIC registers for the virtual processors defined in the system. The outstanding interrupt may be discarded if no virtual processors were mapped to the value of MDA.

In one illustrative example, the MDA mapping data structure 330 may include a vector mapping possible MDA values to APIC identifiers, for the physical interrupt destination mode. In another illustrative example, the MDA mapping data structure 330 may include a two-dimensional table mapping possible MDA values to APIC identifiers, for the logical interrupt destination mode.

Figure 4:
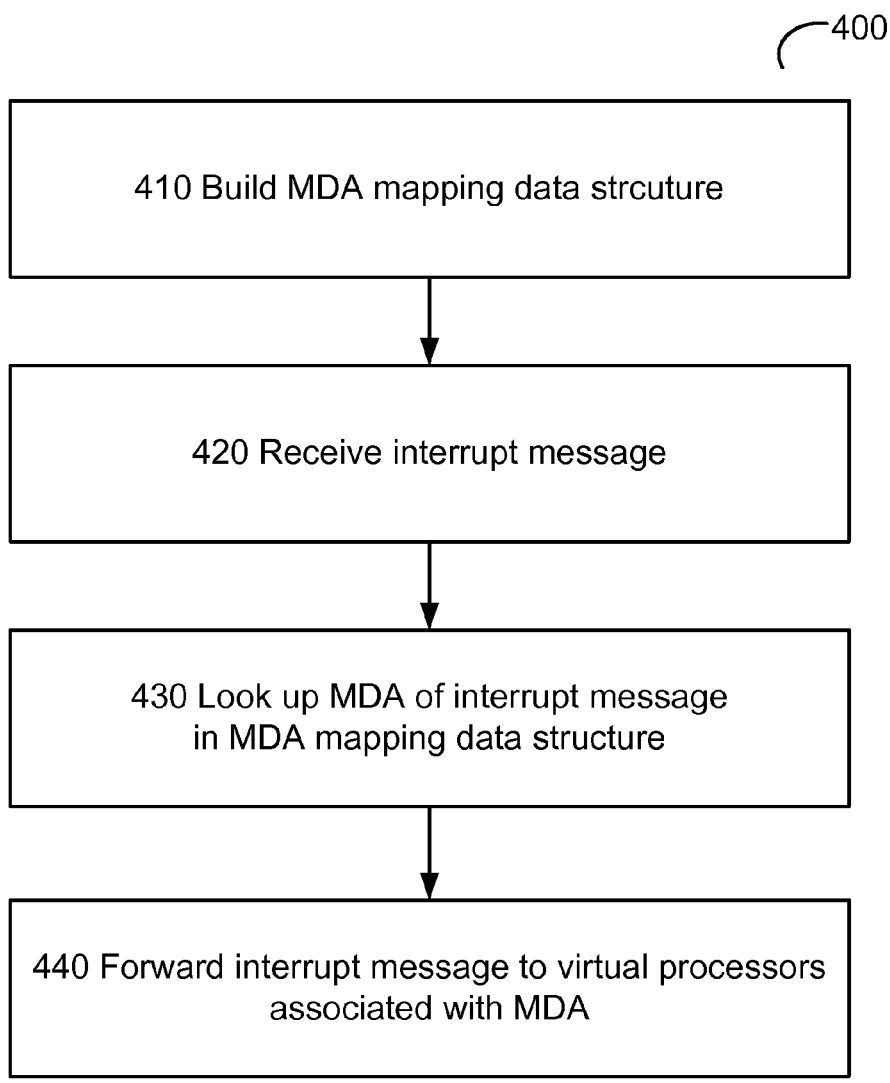
FIG. 4 depicts a flow diagram of a method for injecting interrupts in a virtualized computer system, in accordance with one or more aspects of the present disclosure.

FIG. 4 depicts a flow diagram of an example method 400 for injecting interrupts in a virtualized computer system. The method 400 may be performed by a computer system that may comprise hardware (e.g., circuitry, dedicated logic, and/or programmable logic), software (e.g., instructions executable on a computer system to perform hardware simulation), or a combination thereof. The method 400 and/or each of its individual functions, routines, subroutines, or operations may be performed by one or more physical processors of the computer system executing the method.

At block 410, the hypervisor may build a data structure mapping message destination addresses (MDAs) to virtual processor identifiers for a plurality of interrupt destination modes, including physical and logical interrupt destination modes. In one example, the hypervisor may initialize the MDA mapping data structure as part of the system initialization routine. The hypervisor may further update the MDA mapping data structure upon detecting a change in the state of any virtual processor in the system (e.g., a virtual processor going online or offline).

Responsive to receiving, at block 420, an interrupt message, the hypervisor may, at block 430, look up the MDA of the interrupt message in the MDA mapping data structure. In one illustrative example, the interrupt message may be provided by an inter-processor interrupt (IPI). Alternatively, the interrupt message may be provided by a message-signaled interrupt (MSI).

At block 440, the hypervisor may forward the interrupt message to one or more virtual processors associated with the MDA. In one illustrative example, the virtual processors may be identified by the identifiers of their respective local APICs. In another illustrative example, the interrupt message may be delivered to two or more virtual processors, responsive to the hypervisor's detection of a multicast mode.

Upon completing the operations schematically described by block 440, the method may terminate.

Figure 5:
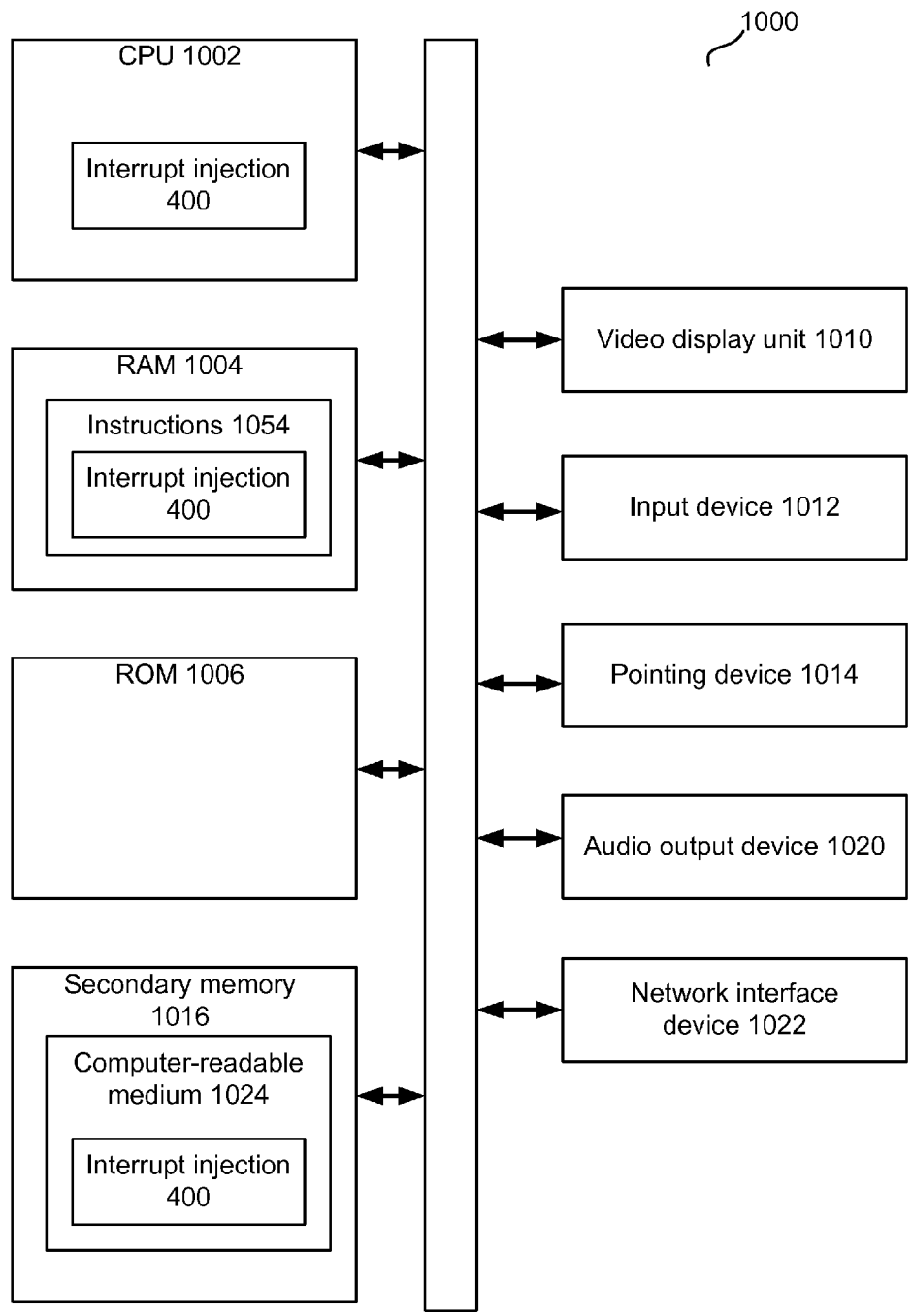
FIG. 5 depicts a block diagram of an illustrative computer system operating in accordance with examples of the invention.

FIG. 5 depicts an example computer system 1000 which can perform any one or more of the methods described herein. In one example, computer system 1000 may correspond to host computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions 1054 encoding any one or more of the methods or functions described herein, including the example method 400 for injecting interrupts in a virtualized computer system. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the methods and/or each of their individual functions, routines, subroutines, or operations. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
providing, by a hardware processor executing a hypervisor, a data structure comprising a two-dimensional table mapping a plurality of message destination addresses (MDAs) to a plurality of Advanced Programmable Interrupt Controller (APIC) identifiers identifying logical processors in a logical interrupt destination mode;
receiving an interrupt message including an MDA of the plurality of MDAs;
identifying an APIC associated with the MDA by the data structure; and
forwarding the interrupt message to a virtual processor associated with the APIC.

2. The method of claim 1, wherein forwarding the interrupt message is performed with respect to a plurality of virtual processors responsive to detecting a multicast mode.

3. The method of claim 1, further comprising updating the data structure responsive to determining a change in a state of the virtual processor.

4. The method of claim 1, wherein the interrupt message is provided by one of an inter-processor interrupt (IPI) or a message-signaled interrupt (MSI).

5. The method of claim 1, further comprising: identifying the virtual processor using a logical destination register of the APIC associated with the MDA.

6. The method of claim 1, wherein the interrupt message represents at least one of: an external interrupt, a non-maskable interrupt, a processor exception, a software-generated interrupt, or an inter-processor interrupt.

7. The method of claim 1, further comprising: comparing the MDA to at least one of: a value stored by a logical destination register and a value stored by a destination format register.

8. A computer-readable non-transitory storage medium comprising executable instructions to cause a hardware processor to:
provide, by the hardware processor executing a hypervisor, a data structure comprising a two-dimensional table mapping a plurality of message destination addresses (MDAs) to a plurality of Advanced Programmable Interrupt Controller (APIC) identifiers identifying logical processors in a logical interrupt destination mode;

receive an interrupt message including an MDA of the plurality of MDAs;

identify an APIC associated with the MDA by the data structure; and forward the interrupt message to a virtual processor associated with the APIC.

9. The computer-readable non-transitory storage medium of claim 8, further comprising executable instructions to cause the hardware processor to update the data structure responsive to determining a change in a state of a virtual processor.

10. The computer-readable non-transitory storage medium of claim 8, wherein the interrupt message is provided by one of an inter-processor interrupt (IPI) or a message-signaled interrupt (MSI).

11. The computer-readable non-transitory storage medium of claim 8, further comprising executable instructions to cause the hardware processor to identify the virtual processor using a logical destination register of the APIC associated with the MDA.

12. The computer-readable non-transitory storage medium of claim 8, wherein the interrupt message represents at least one of: an external interrupt, a non-maskable interrupt, a processor exception, a software-generated interrupt, or an inter-processor interrupt.

13. The computer-readable non-transitory storage medium of claim 8, further comprising executable instructions to cause the hardware processor to compare the MDA to at least one of: a value stored by a logical destination register or a value stored by a destination format register.

14. A system comprising:

a memory; and a hardware processor, operatively coupled to the memory, to:

provide a data structure comprising a two-dimensional table mapping a plurality of message destination addresses (MDAs) to a plurality of Advanced Programmable Interrupt Controller (APIC) identifiers identifying logical processors in a logical interrupt destination mode;

receive an interrupt message including an MDA of the plurality of MDAs;

an APIC associated with the MDA by the data structure; and forward the interrupt message to a virtual processor associated with the APIC.

15. The system of claim 14, wherein the hardware processor is to forward the interrupt message to a plurality of virtual processors responsive to detecting a multicast mode.

16. The system of claim 14, wherein the hardware processor is further to update the data structure responsive to determining a change in a state of the virtual processor.

17. The system of claim 14, wherein the interrupt message is provided by one of an inter-processor interrupt (IPI) or a message-signaled interrupt (MSI).

18. The system of claim 14, wherein the hardware processor is further to cause the hardware processor to identify the virtual processor using a logical destination register of the APIC associated with the MDA.

19. The system of claim 14, wherein the interrupt message represents at least one of: an external interrupt, a non-maskable interrupt, a processor exception, a software-generated interrupt, or an inter-processor interrupt.

20. The system of claim 14, wherein the hardware processor is further to compare the MDA to at least one of: a value stored by a logical destination register or a value stored by a destination format register.

* * * * *